United States Patent [19]

Brown

[11] 3,864,657

[45] Feb. 4, 1975

[54] CONDITION RESPONSIVE CONTROL DEVICE

[75] Inventor: Ronald W. Brown, Minneapolis, Minn.

[73] Assignee: Thermo King Corporation, Minneapolis, Minn.

[22] Filed: Jan. 14, 1974

[21] Appl. No.: 433,335

[52] U.S. Cl. .................. 337/311, 337/117, 337/312
[51] Int. Cl. .......................................... H01n 37/36
[58] Field of Search ..................... 337/117, 306–317

[56] References Cited
UNITED STATES PATENTS

| | | | |
|---|---|---|---|
| 2,314,211 | 3/1943 | Hausler | 337/312 |
| 3,309,480 | 3/1967 | Machado | 337/311 |
| 3,571,563 | 3/1971 | Shulz | 337/312 |

FOREIGN PATENTS OR APPLICATIONS

| | | | |
|---|---|---|---|
| 1,382,050 | 11/1974 | France | 337/309 |

Primary Examiner—Donovan F. Duggan
Assistant Examiner—Fred E. Bell
Attorney, Agent, or Firm—C. F. Renz

[57] ABSTRACT

This invention relates to a control device including an expandable bellows member attached at one end to a frame and having a condition responsive movable end. A linkage member having knife edges is interposed between the bellows movable end and a lever arm which is adapted to be moved to actuate an electric switch mechanism due to a relative displacement of the bellows being transmitted through the linkage. A cup shaped spring engaging means extends from the linkage to surround the linkage end communicating with the bellows movable end. The base of a conically shaped spring member engages the frame of the control device and the apex end of the spring is received by the cup-shaped engaging means.

4 Claims, 1 Drawing Figure

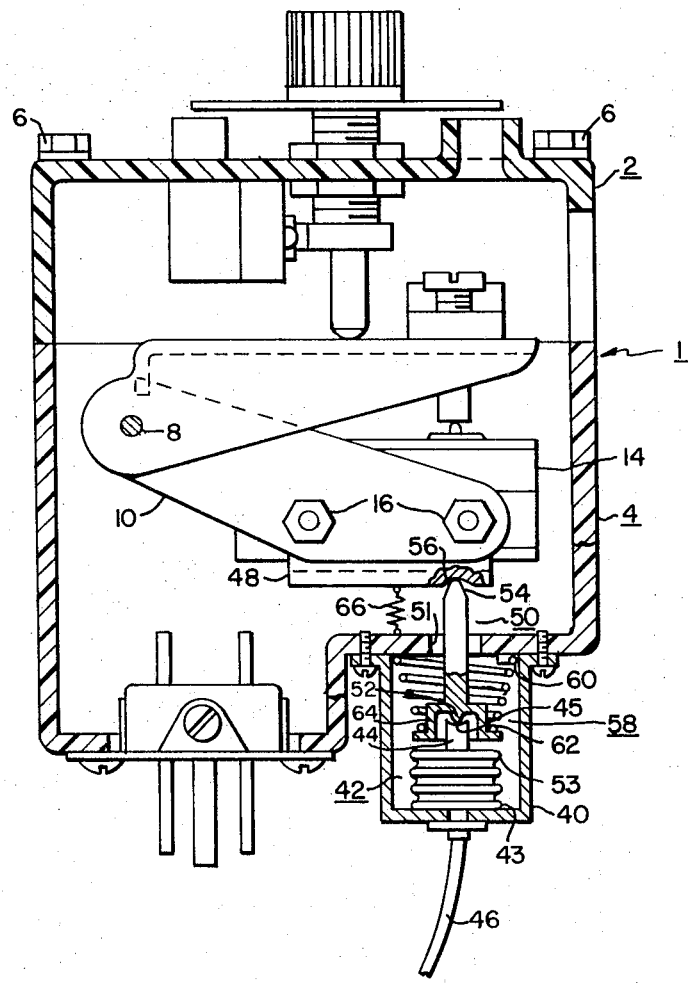

CONDITION RESPONSIVE CONTROL DEVICE

CROSS REFERENCES TO RELATED APPLICATIONS

So far as known, this application does not relate to any other pending patent application.

BACKGROUND OF THE INVENTION AND PRIOR ART

Condition responsive thermostatic control devices have been employed in various environments including electrically heated appliances, such as clothes dryers or ovens, or for controlling refrigeration, such as in trailer trucks containing a cargo to be refrigerated by a transportable refrigeration unit. One example of a condition responsive thermostatic control device useful for controlling refrigeration in trailer trucks of the aforementioned type is described in U.S. Pat. No. 3,309,480 issued Mar. 14, 1967 to John S. Machado. The device disclosed therein by the aforementioned patent includes a pair of transversely spaced pivotable lever arms which are adapted to be moved to operate an associated switch mechanism. A condition responsive bellows having a movable end with a plunger member attached thereto and in contact with the transversely spaced arms is conditioned to expand or contract with the bellows and move the arms about a fixed shaft to thereby actutate the switch mechanism should predetermined conditions exist in the environment of the device.

However, several problems may arise with the above previous control device arrangement. It has been found that should the control device be exposed to shock conditions, the bellows and its associated plunger member experience a lack of stability which may result in a movement that could cause a switch mechanism to be undesirably actuated. It has also been found that the plunger member, under certain circumstances, does not exhibit the degree of sensitivity which would be required if the bellows were to be expanded in small increments.

Therefore, it would be more desirable to provide an improved condition responsive control device which could exhibit a maximum degree of sensitivity with stability in case of shock conditions by providing a unique linkage and retention means therefore between the bellows movable end and the spaced movable arms.

SUMMARY OF THE INVENTION

A condition responsive control device is disclosed which includes a frame, an expandable bellows member, attached at one end to the frame and having a condition responsive movable end, and a lever arm pivotably supported about a fixed shaft disposed on the frame and movable to actuate electric switches. A linkage member is to be interposed between the bellows movable end and the lever arm. The linkage member has a first knife edge engaging the lever arm and a second knife edge for engaging the bellows movable end whereby relative displacements of the bellows movable end are transmitted through the linkage to cause the lever arm to be moved. The lever arm is provided with a notch for receiving the linkage first knife edge. A cup shaped spring engaging means extends from the linkage member to surround the linkage second knife edge. The base of a conical spring engages the frame and the apex of the spring is received by the cup shaped spring engaging means to thereby bias the linkage member against the bellows member movable end to provide desired alignment of the linkage. The lever arm is to be held against the linkage member by a spring fixed between the lever arm and the frame.

BRIEF DESCRIPTION OF THE DRAWING

The FIGURE is a side elevation of the improved control device of the instant invention, partly in section and partly broken away.

DESCRIPTION OF THE PREFERRED EMBODIMENT

Referring to the FIGURE of the drawings, a control device similar to that shown in U.S. Pat. No. 3,309,480, issued Mar. 14, 1967, is shown including a generally rectangular box or frame portion 1 which is divided into top 2 and bottom 4 portions secured together by any suitable means, such as by a set of bolts 6, as illustrated. A pin member 8 extends through the width of frame 1 and is secured to the front and back walls (not shown) of the lower portion 4 of frame 1. Pin 8 serves as a fixed pivot support for a lever arm 10 which is attached at its rear end to pin 8 and is adapted to be pivoted about the axis of pin 8. A switch mechanism 14 is attached by bolt means 16 to pivotable lever arm 10 to thereby enable lever arm 10 and switch 14 to be pivoted in unison about the axis of pin 8. Although only one such switch 14 is shown, a plurality of switches may be conveniently arranged along the length of bolts 16 with the aid of any conventional spacing means. It should be understood, however, that the number of switches, the spacing means therefor, and the means of attaching the switches to lever arm 10 are not essential to the understanding of the instant invention and form no part thereof. However, if a more detailed description is required, reference may be made to Pat. No. 3,309,480. Switch 14 may be of the conventional microswitch type, well known to those skilled in the art.

In accordance with the instant improvement, a support member 40 is attached to the underside of the lower frame portion 4 to comprise an extension of the frame 1. Enclosed within support member 40 is an expandable bellows 42 attached at its lower end 43 to the support 40 and having a condition responsive movable upper end 53 which is terminated by an extension piece 44. The lower fixed end 43 of bellows 42 may be connected to a capillary tube 46 which can contain a conventional temperature responsive fluid suitable for expanding bellows 42 upon a predetermined change in the environment conditions of the control device.

A bearing plate 48 is attached to the lower part of lever arm 10. A linkage member 50 extends through an aperture 51 formed in frame 1 to be interposed between the lever arm bearing plate 48 and a recess 45 formed in bellows extension piece 44. Linkage member 50 includes a lower knife edge 52 which is adapted to be received by the recess 45 formed in bellows extension 44 and an upper knife edge 54 which is adpated to be received by a notched recess 56 cut into the lever arm bearing plate 48 to help confine linkage knife edge 54 and to provide a proper alignment between linkage 50 and lever arm 10 so that relative displacements of the bellows movable end 53 can be transmitted through the linkage 50 to subsequently cause lever arm 10 to be pivoted about the axis of pin 8 for the purpose of actuating or deactuating a switch mechanism 14.

A spring engaging cup-shaped member 64 extends from the linkage 50 and surrounds the linkage lower knife edge 52. A conical spring 58 having a base end 60 and an apex end 62 is positioned so that the base end 60 engages the lower portion 4 of frame 1 and the apex end 62 of spring 58 will be received by the cup-shaped spring engaging means 64, as shown, to provide stability and to properly bias the linkage member 50 against the recess formed in the bellows member movable end extension piece 44. It should be noted that when in the assembled relationship of the instant invention, the lever arm 10 and its associated bearing plate 48 may be lifted away from linkage knife edge 54 without effect, as the linkage member will retain its relatively vertical position as shown ready to be received by the bearing plate notch recess 56 when the lever arm 10 and bearing plate 48 are again placed in contact with linkage member 50. This feature has the added advantage of maintaining proper alignment and sensitivity between linkage 50 and lever arm 10 during operation or in the event that the linkage 50 and switch mechanism 14 must be removed from the frame 1 for repair or replacement. In operation, bearing plate 48 will be held against linkage knife edge 54 by means of a resilient spring means, such as that illustrated at 66.

The instant improvement has advantages over the prior art control devices in that the knife edged linkage herein disclosed, which transmits the travel of an expanding bellows to electrical switches, experiences low friction forces for maximum sensitivity to thereby allow the actuation of the switches to closely follow the movement of the bellows. In this connection, it will be noted that the knife edged linkage member 50 extends through the opening 51 without contacting the walls of such opening thus avoiding any frictional contacts at these points. Means have also been provided to increase linkage stability and to secure a proper alignment between the bellows and the pivotable lever arm so as to insure accuracy of thermostat control over wide temperature differentials.

I claim as my invention:

1. A control device including:
   a frame;
   an expandable bellows member attached at one end to said frame and having a condition responsive movable end;
   a lever arm movably supported on said frame to actuate electric switch means;
   a linkage member to be interposed between said bellows movable end and said lever arm and having a first knife edge engaging said lever arm and a second knife edge engaging said bellows movable end whereby relative displacement of said bellows movable end are transmitted through said linkage to thereby cause said lever arm to be moved;
   a cup-shaped spring engaging means extending from said linkage member to surround its second end; and
   conical spring means having a base end and an apex end, said base end engaging said frame portion and said apex end being received by said cup-shaped means, to thereby bias said linkage member against said bellows member movable end and provide a desired alignment of said linkage.

2. The invention of claim 1, wherein said lever arm includes a recess formed therein to receive said linkage member first knife edge.

3. The invention of claim 1, including spring means to be attached between said lever arm and said frame to retain said lever arm in engagement with said linkage member first knife edge.

4. The invention of claim 1, wherein said lever arm includes a recess formed therein to receive said linkage member first knife edge and including spring means to be attached between said lever arm and said frame to retain said lever arm in engagement with said linkage member first knife edge.

* * * * *